United States Patent [19]

Schick

[11] Patent Number: 5,186,841
[45] Date of Patent: Feb. 16, 1993

[54] COOLING WATER OZONATION SYSTEM

[75] Inventor: Robert P. Schick, Amherst, N.Y.

[73] Assignee: Praxair Technology Inc., Danbury, Conn.

[21] Appl. No.: 787,825

[22] Filed: Nov. 5, 1991

[51] Int. Cl.$^5$ ............................................. C02F 1/78
[52] U.S. Cl. ................................. 210/760; 210/167;
210/194; 210/199; 210/221.2; 261/36.1;
261/76; 261/DIG. 46; 261/DIG. 42; 261/DIG.
11; 261/DIG. 75
[58] Field of Search ............... 261/36.1, 76, DIG. 46,
261/DIG. 11, DIG. 42, DIG. 75; 210/167, 194,
199, 221.2, 760, 790, 175

[56] References Cited

U.S. PATENT DOCUMENTS

| | | | |
|---|---|---|---|
| 3,326,747 | 6/1967 | Ryan et al. | 210/760 |
| 3,856,671 | 12/1974 | Lee et al. | 210/760 |
| 4,052,960 | 10/1977 | Birkbeck et al. | 119/3 |
| 4,098,691 | 7/1977 | Filby | 210/29 |
| 4,172,786 | 10/1979 | Humphrey et al. | 210/57 |
| 4,176,061 | 11/1979 | Stopka | 210/63 Z |
| 4,764,283 | 8/1988 | Ashbrook et al. | 210/695 |
| 4,992,216 | 2/1991 | Saita et al. | 261/122 |
| 5,075,016 | 12/1991 | Barnes | 210/760 |
| 5,145,585 | 9/1992 | Coke | 210/760 |

OTHER PUBLICATIONS

Karel Stopka, "Why Ozone is a Viable Alternative to Chemical for the Treatment of Cooling Tower and Heat Exchanger Water", Industrial Water Treatment, vol. 31, No. 3, Aug. 1984.

Banks Edwards, "Ozone—An Alternate Method of Treating Cooling Tower Water", Journal of Cooling Water Tower Institute, vol. 8, No. 2, pp. 10-21, 1987.

Primary Examiner—Stanley S. Silverman
Assistant Examiner—Neil M. McCarthy
Attorney, Agent, or Firm—Chung K. Pak

[57] ABSTRACT

The invention relates to injecting ozone through at least one injecting means operating with a pressure drop of at least about 35 psi into a pressurized stream of aqueous solution, allowing the ozone injected stream to travel or flow at a velocity of at least about 7 feet per second for a distance sufficient to dissolve at least about 70% of the ozone injected and mixing the resulting ozonated stream with an aqueous stream solution to be ozonated.

21 Claims, 7 Drawing Sheets

COOLING WATER OZONATION SYSTEM

TECHNICAL FIELD

The invention in general relates to processes and apparatus for dissolving ozone in an aqueous solution and, more particularly to processes and apparatus for solution of ozone in water used in cooling or recycling systems.

BACKGROUND OF THE INVENTION

Ozone has been known to be useful for inhibiting, reducing and/or eliminating, among other things, biomass, mold, mildew, algae, fungi, bacterial growth and scale deposits in various aqueous solution systems. Ozone, for example, has been used as a biocide for the treatment of drinking water and as a phenols and cyanide removing means in the treatment of industrial wastewater streams. It may also be used in killing zebra mussels but it is particularly useful for oxidizing organic or inorganic contaminants in cooling water systems or water recycling systems. The effectiveness of ozone in each system, however, is adversely affected by its low solubility and low utilization in aqueous solutions.

Bubbling ozone directly into the water to be ozonated, i.e. cooling water in a tower basin, has been used to dissolve ozone in aqueous solutions. Such a technique, however, does not dissolve ozone sufficiently in aqueous solutions because the ozone bubbles rise before a substantial amount of ozone can be dissolved into aqueous solutions. When the quantity of dissolved ozone in the cooling water, for example, is less than that required to treat a cooling water system, the piping and process heat exchanger of the cooling water system may become clogged due to the uninhibited scale deposits and biological growth.

Injecting ozone into a recycling aqueous stream which is to be mixed with an aqueous solution to be ozonated has also been utilized to dissolve ozone in the aqueous solutions. In a cooling water system, for instance, ozone is injected into a side stream conduit which circulates a portion of the cooling water. The ozone injected water in the side stream conduit is then mixed with the cooling water in a tower basin, thereby ozonating the cooling water before its use in process heat exchange means. The cooling water system designed to operate in such a manner is described, for example, in U.S. Pat. No. 4,172,786 and Journal of the Cooling Tower Institute, vol 8, No. 2, 1987. Although this system dissolves more ozone than a system designed to feed ozone directly into the cooling water in the tower basin, much of the ozone injected is still gassed off to the atmosphere and/or is converted to oxygen rather than being dissolved in the cooling water. Therefore, this system is not sufficiently efficient in dissolving ozone, thus requiring the use of a large amount of ozone. There is a need to dissolve an increased amount of ozone in aqueous solutions, not only to minimize the amount of ozone used but also to provide sufficiently ozonated aqueous solutions for given systems.

Accordingly, it is an object of the present invention to dissolve an increased amount of ozone, thereby decreasing the amount of ozone needed to produce sufficiently ozonated aqueous solutions for given systems.

It is another object of the present invention to minimize the conversion of ozone to oxygen during the ozonation of aqueous solutions and reduce the emission of ozone to the atmosphere to avoid any detrimental atmospheric effects.

SUMMARY OF THE INVENTION

According to the present invention, the above objectives and other objectives apparent to those skilled in the art upon reading this disclosure are attained by the present invention which is drawn to processes and apparatus for dissolving ozone in aqueous solutions. Generally, the processes involve injecting ozone through an injector operating with a pressure drop of at least about 35 psig into a stream of aqueous solution to form an ozone containing stream. The ozone containing stream is then optionally combined with a second aqueous solution. The resulting stream, i.e., the ozone containing stream or the combined stream, is usually allowed to flow or travel at a velocity of at least about 7 feet per second for a distance sufficient to dissolve at least about 70% of the ozone injected. The distance is determined solely on the basis of an ozone-in-water mass transfer rate. Once the ozone containing stream or the combined stream containing ozone flows or travels the required distance, it may be used alone for its intended purpose or may be mixed with an aqueous solution to be ozonated. The ozone containing stream or combined stream may represent a portion of an aqueous solution to be ozonated, which is recirculating or recycling in a cooling water system or a water recycling system.

The apparatus employed in the above processes generally involves means for increasing the pressure of a stream of aqueous solution to at least 35 psi higher than the pressure of ozone injected stream, ozone injection means for introducing ozone into the stream, means for regulating or increasing the velocity of the ozone injected streams to at least 7 feet per second, means for allowing the ozone injected stream to flow or travel for a distance sufficient to dissolve at least about 70% of the injected ozone and means for mixing the resulting ozonated stream with an aqueous solution to be ozonated.

As used herein, the term "aqueous solution" means any liquid containing water, including impure water.

As used herein, the term "a cooling water system" means a system in which water is used as a cooling medium for at least one process heat exchanger.

As used herein, the term "a water recycling system" means a system in which water is circulated for the reusing purposes.

As used herein, the term "ozonated" means that ozone is dissolved in a given aqueous solution.

DETAILED DESCRIPTION OF INVENTION

Figure 1:
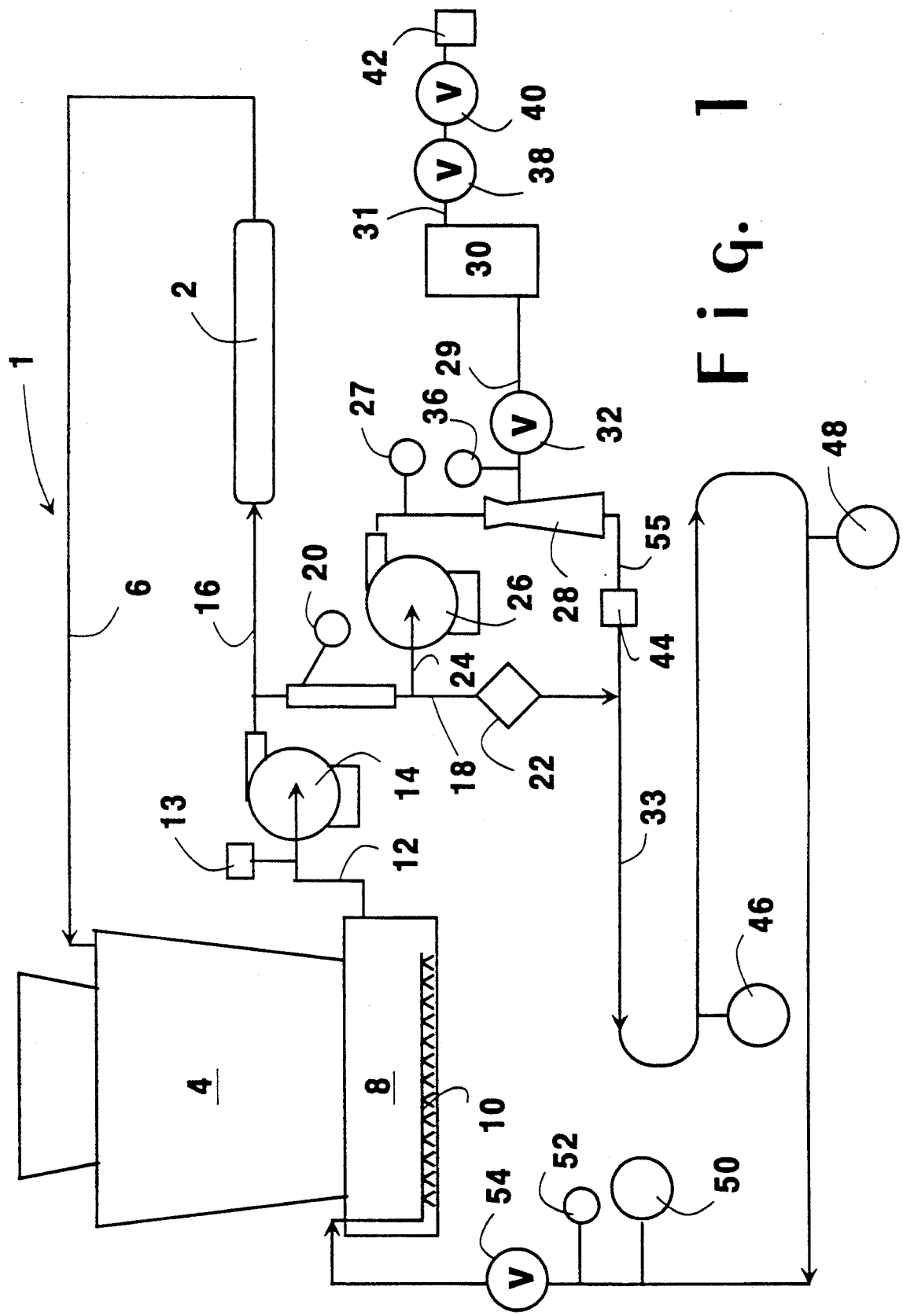
FIGS. 1-7 are some of the preferred embodiments of the present invention, which illustrate schematic flow chart diagrams of cooling water ozonation systems.
Figure 2:
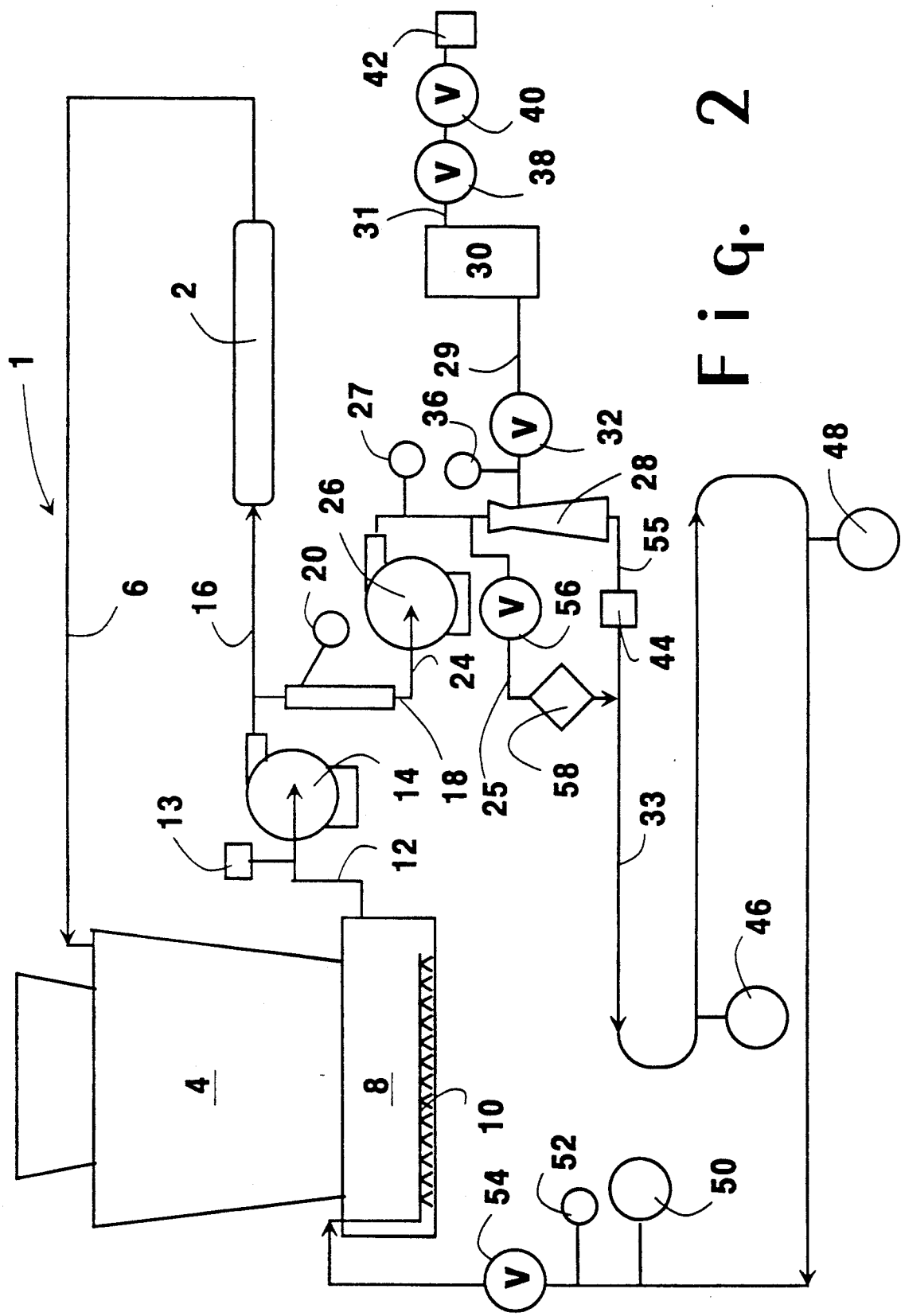
Figure 3:
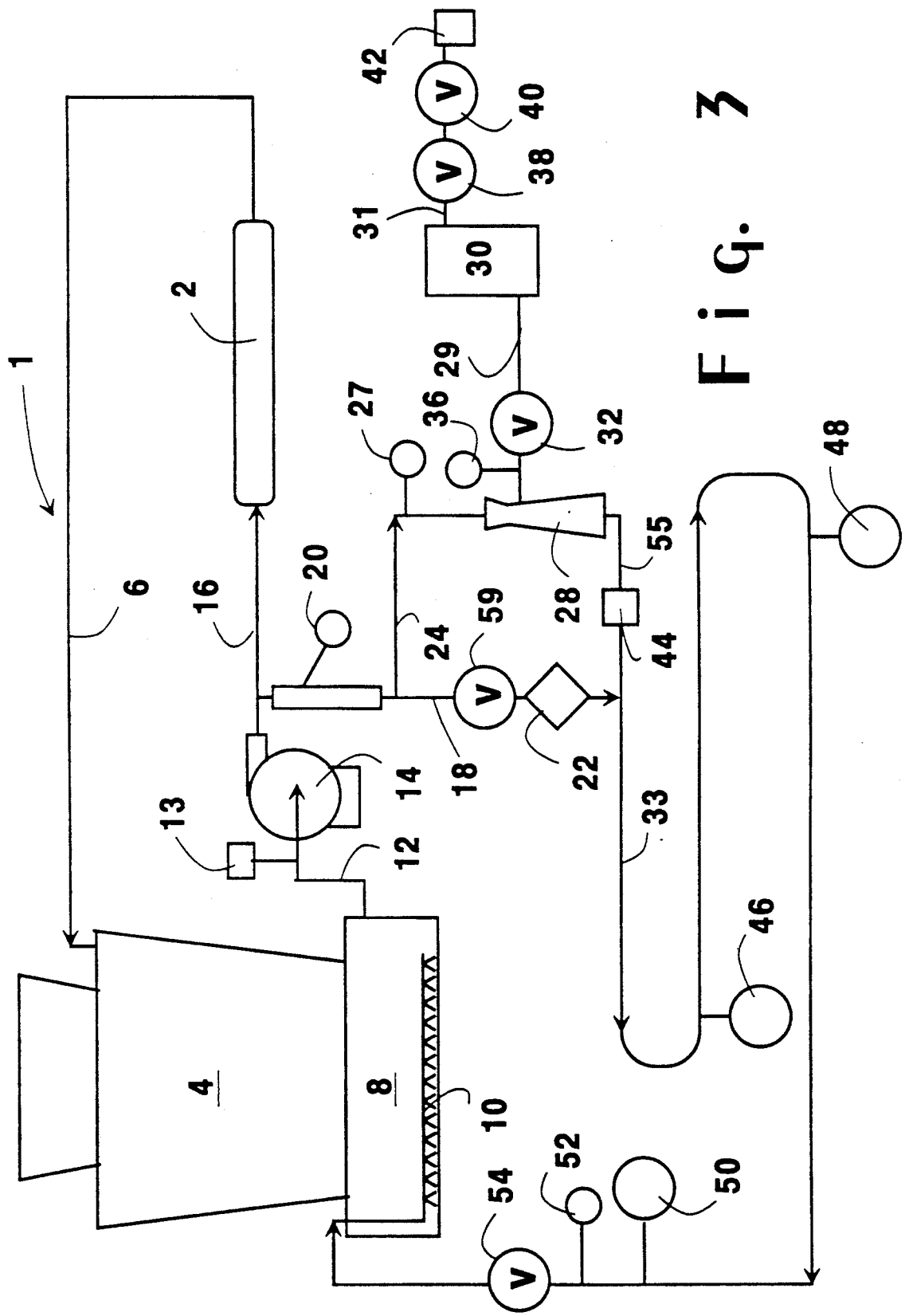
Figure 4:
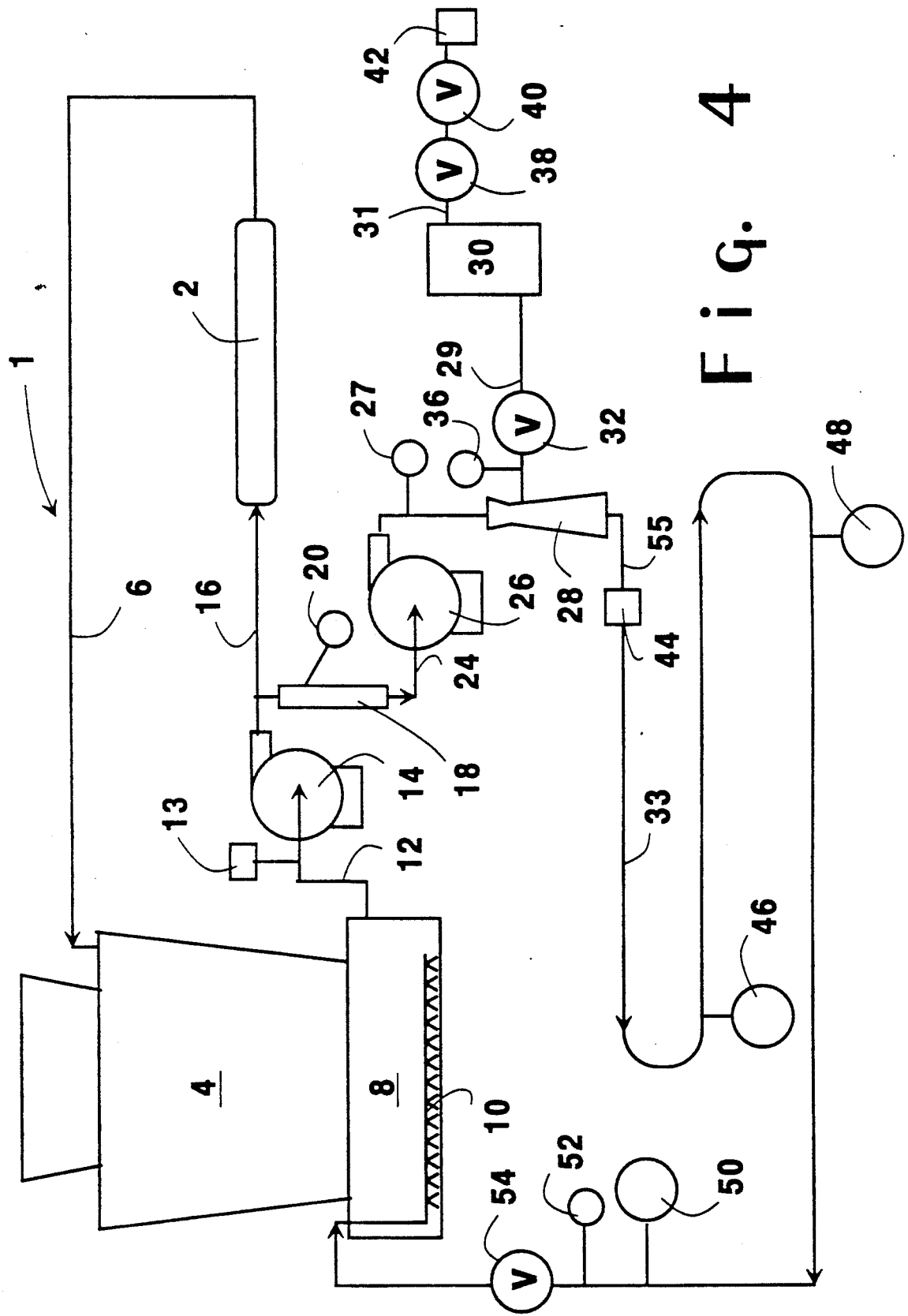

The present invention represents an improvement in producing ozonated aqueous solutions. It has been discovered that all or most of the injected ozone can be dissolved in a given aqueous solution at particular conditions. The discovery entails pressuring a stream of aqueous solution prior to injecting ozone; injecting ozone through an injector operating with a high pressure drop; and allowing the ozone injected stream to travel or flow at a high velocity for a particular distance which is determined solely on the basis of an ozone-in-water mass transfer rate or utilization relationship.

These conditions or designs are helpful in creating gas side vacuum and sufficient shear at a point where ozone gas is introduced to cause the formation of minute ozone gas bubbles which enhances the rate of solution of ozone in aqueous solutions and in preventing or deterring the minute ozone bubbles from rising or coalescing prior to dissolution. The advantages derived therefrom involve, inter alia, increasing the amount of ozone dissolved, minimizing the conversion of ozone to oxygen and reducing the emission of ozone to the atmosphere to avoid any toxic atmospheric hazards.

Referring now to the figures, there is illustrated a preferred embodiment of the present invention wherein the treatment of water with ozone is carried out in particular cooling water ozonation systems. The systems (1) generally comprises particularly arranged conduits (6, 12, 16, 18, 19, 24, 25, 29, 31, 33 and 55), pump means (14 and 26), ozone generating and injecting means (30 and 28) process heat exchanging means (2) and a cooling tower (4) associated with a basin (8). Hot water from the process heat exchanger (2) is introduced into the cooling tower (4) via a conduit (6). The cooling tower (4) may be mechanical draft type, atmospheric type or natural draft type, which are typically operated by latent heat transfer owing to vaporization of a small portion of water and sensible heat transfer owing to the difference in temperatures of water and air. By this operation, the hot water is cooled in the cooling tower (4) as it falls or flows downwardly into the basin (8). In the basin (8), the resulting cooled water is mixed with an ozonated water having a usual ozone concentration of about 1 to about 1.8 mg of ozone per liter of water diffusing from at least one distribution means (10). It may be desirable to diffuse an ozonated water having a high ozone concentration. The amount of the ozonated water provided through the distribution means (10), however, is usually dependent on the amount of water in the basin (8). Generally, the volume ratio of the ozonated water to the water in the basin (8) is such that any localized ozone concentration in the resulting water mixture in the basin (8) is less than about 0.5 mg of ozone/liter of water. To obtain the desired ozone distribution in the resulting water mixture in the basin (8), the distribution means employed should promote the mixing. Perforated pipe type distribution means, for example, are useful in shallow water basins while mixing eductor type distribution means are useful in deep water basins having a depth of greater than about 5 feet.

The resulting ozonated water mixture in the basin (8) moves along a conduit (12) having an oxidation-reduction potential meter (13) to a pump (14). The pump (14) forces at least a portion of the water in the conduit (12) through a conduit (16) to the inlet side of the process heat exchanging means (2). The process heat exchange means (2) is usually a part of a mechanical and/or chemical process system, which employs an aqueous solution, such as water, in removing at least part of the heat resulting from the operation of the mechanical and/or chemical process system. In the process heat exchange means (2), the water used as a cooling medium is heated. The resulting hot water, which exits from the outlet side of the process heat exchange means (2), is returned to the cooling tower (4) through the conduit (6).

As shown in the figures, there are several preferred ways by which ozonated water can be continuously produced. These preferred embodiments, of course, in no way preclude other variations which will become readily apparent to those skilled in the art. In FIGS. 1-4, a portion of the water in the conduit (12) is delivered to a conduit (18) having a strainer (20), an optional valve (59) and an optional flow meter (22). The strainer is generally used for removing small particulates while the flow meter is used for monitoring the flow rate of the water. Once at least a portion of the small particulates are removed, a portion or all of the water moving along the conduit (18) is withdrawn through a conduit (24) having a pressure indicator (27) and, optionally, a booster pump (26). The pressure indicator is used to monitor the pressure of the water in the conduit (24) as the water is traveling toward a point at which ozone is injected. Absent sufficient head from the primary pump (14), a booster pump (26) or equivalent thereof is usually necessary to achieve the desired pressure condition in the conduit (24). The desired pressure condition is generally within the range of about 35 psi to about 65 psi above the pressure range in conduits (33) and (55). This pressurized water may be then partially removed through a by-passing conduit (25) having a valve (56) and an optional flow meter (58). The remaining portion, if not all, of the pressurized water in the conduit (24) is directed to a point where ozone is introduced. The ozone is injected with a venturi type injector (28) which is operating with a pressure drop of at least about 35 psi, preferably a pressure drop between about 50 psi and about 60 psi, to insure the creation of minute ozone bubbles. The minute ozone bubbles, due to their sizes, provide a greater surface area for a given amount of ozone, thereby improving the mass transfer rate of ozone to the water. The resulting ozone-injected water stream in the conduit (55) may be then combined with the water in the conduit (18) and/or the conduit (25) before being supplied to the distribution means (10) through the conduit (33).

Figure 5:
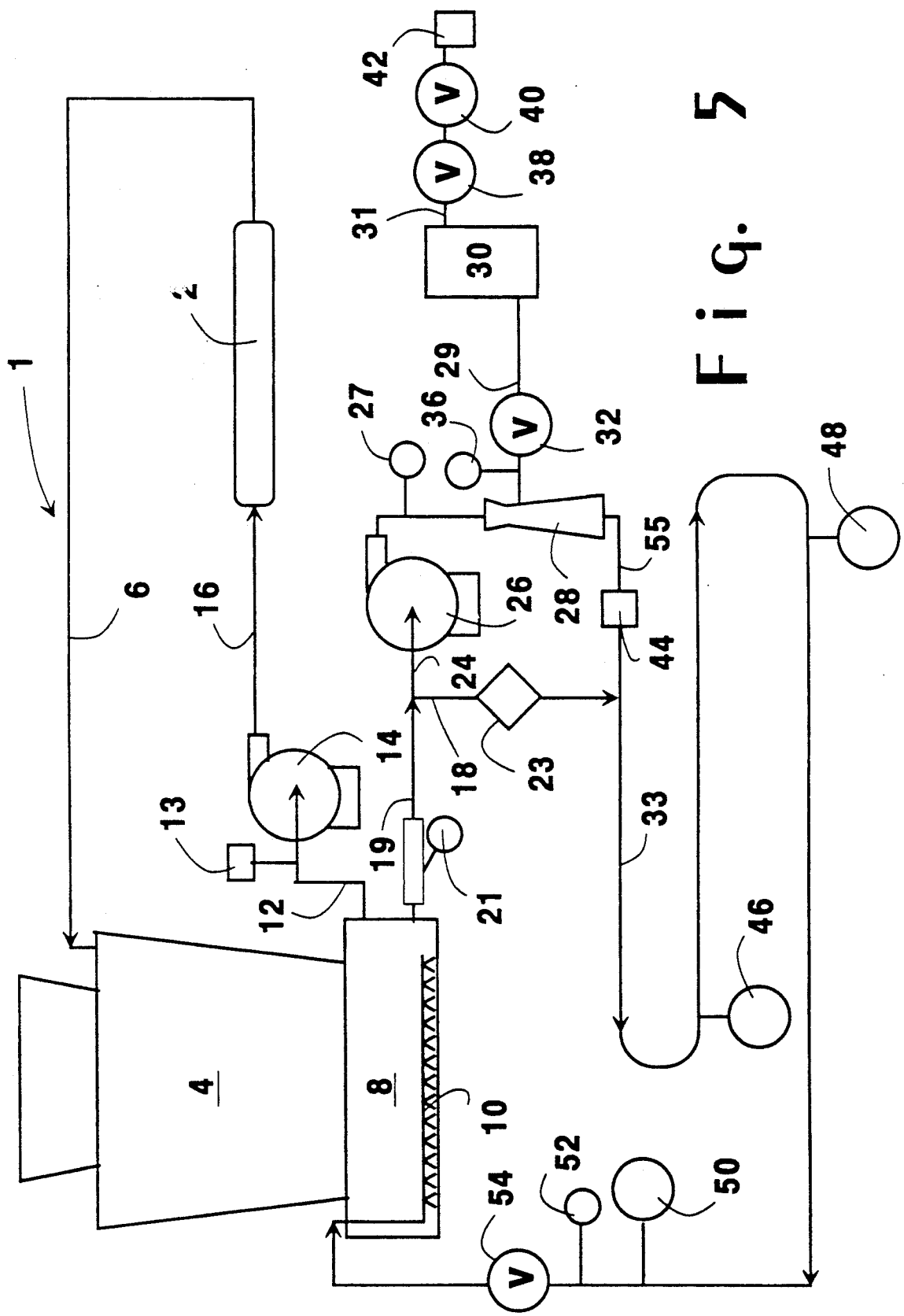
Figure 6:
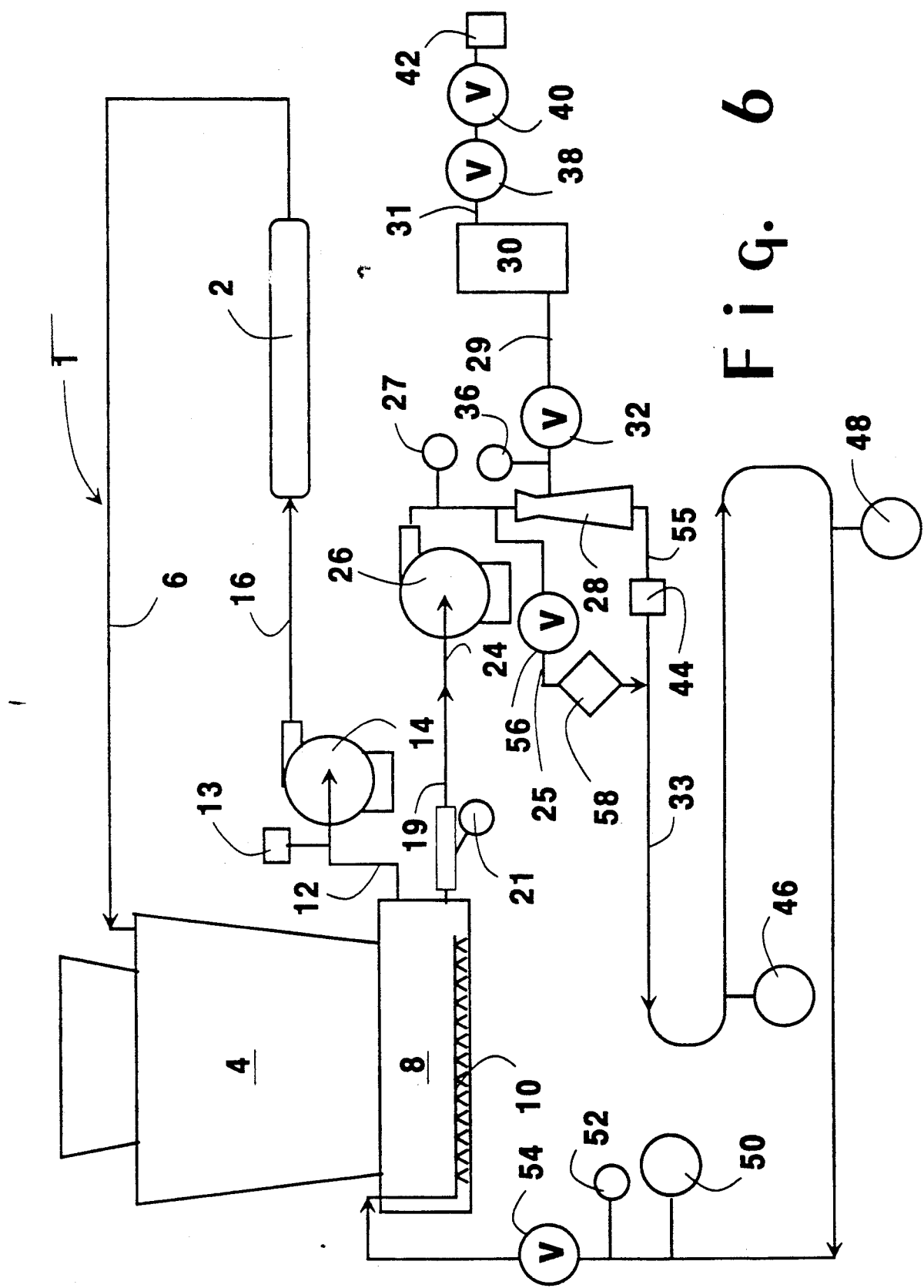
Figure 7:
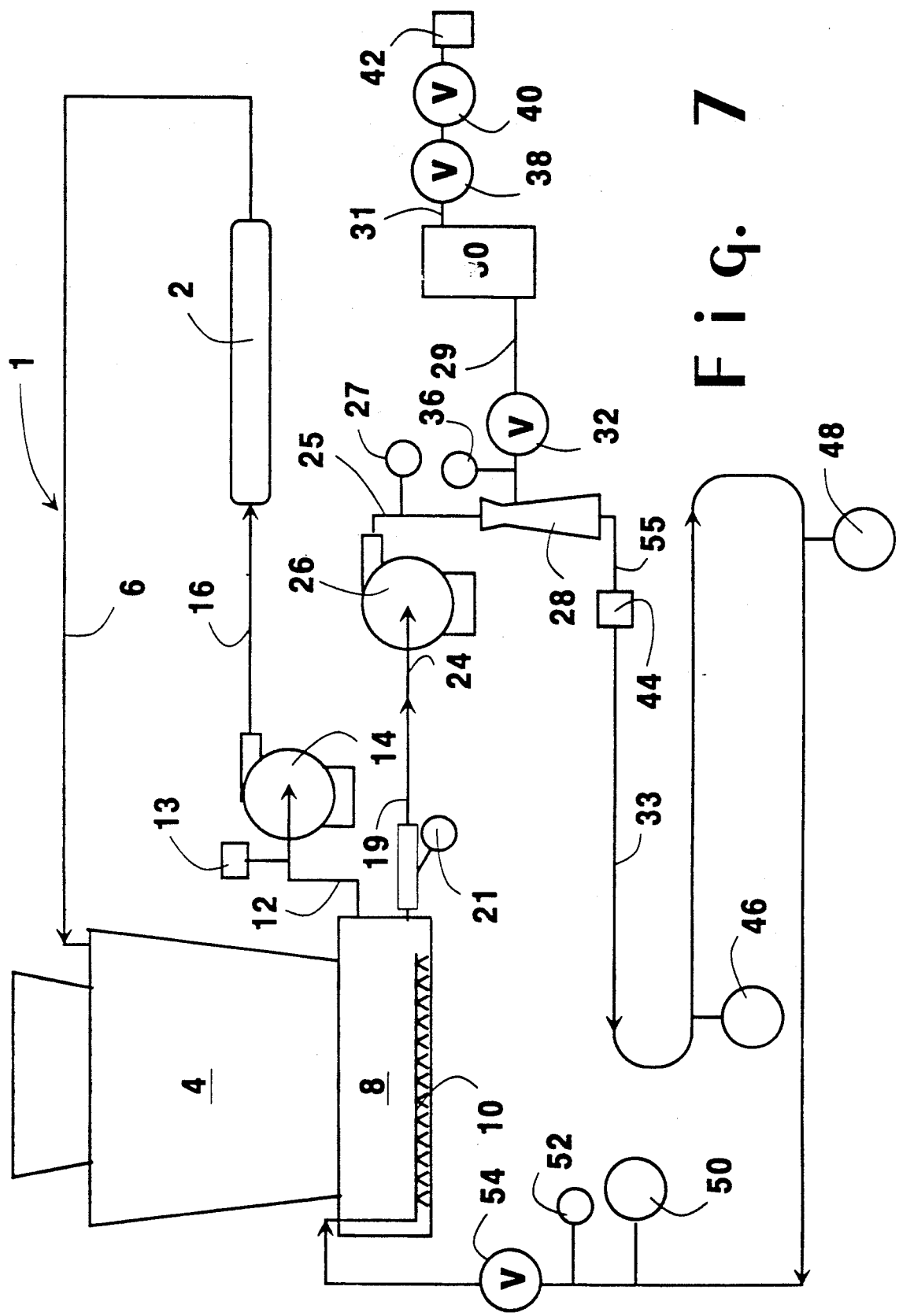

As opposed to using a portion of the water from the conduit (12), a portion of the water in the basin can be directly delivered to a point where ozone is introduced. In FIGS. 5-7, a portion of the water mixture in the basin (8) is withdrawn through a conduit (19) having an optional flow meter (23). All or a portion of the water in conduit (19) is supplied to the conduit (24) having the pump (26) and the pressure indicator (27). The water in the conduit (24) is pressurized via the pump (26) to achieve the desired pressure condition. The desired pressure condition is within the range of about 35 psi to about 65 psi higher than the pressure range in the conduits (33) and (55). A portion of this pressurized water may be withdrawn through a by-passing conduit having a valve (56) and an optional flow meter (58). All or the remaining portion of the pressurized water in the conduit (24) is directed to a point where ozone is introduced.

The ozone is injected into the pressurized water with a venturi type injector (28) which is operating with a pressure drop greater than about 35 psi, preferably a pressure drop between about 50 psi and about 60 psi to insure the creation of minute ozone bubbles. The minute ozone bubbles, due to their sizes, provide a greater surface area for a given amount of ozone, thereby improving the mass transfer rate of ozone to the water. The resulting ozone injected water stream in the conduit (55) having a flow meter (44) may be then combined with the water in the conduit (19) and/or the conduit (25) before being supplied to the distribution means (10) through the conduit (33).

In the conduit (33), the velocity of the water stream needs to be maintained at greater than about 7 feed per second preferably about 9 to about 15 feet per second, in order to deter ozone bubbles from coalescing in the water and/or rising to the surface of the water. A pressure indicator (52) and a valve (54) can be used to regulate the flow and pressure of the water stream in the conduit (33) so that the water therein can flow at the desired velocity under the desired pressure condition.

Several sampling means (46, 48 and 50) may be provided along the conduit (33) to determine the ozone concentration level in the water stream before entering the basin (8). The length of the conduit (33), herein referred to as a water side stream conduit, is such that all or most (at least 70%, preferably at least 85% by weight) of the ozone injected is dissolved in the water prior to reaching the basin (8). (Dissolution efficiency stated assumes zero ozone demand). Such a length is determined solely on the ozone-in-water mass transfer rate relationship which may be defined by a formula:

$$\Delta C = k\, T_v$$

$$k = 0.02691\, (\text{ID Pipe})^{-0.68}$$

$$T_v = \left[\frac{A\text{ pipe}}{GPM}\right] L$$

$\Delta C = (C\text{ sat.} - C)$ $C_{sat.}$ = Ozone solubility at saturation conditions (solubility in mgO$_3$/liter aqueous solution)

C = Actual ozone solubility (solubility mgO$_3$/liter aqueous solution)

IDpipe = Internal Diameter of pipeline (ins)

Apipe = Internal cross-sectional area of pipeline (in.$^2$)

GPM = Aqueous solution volumetric flow rate (gallons per minute)

L = pipeline length (ft)

Note that such a formula may be programmed in a computer to design an appropriately sized conduit (33). In the absence of any by-passing conduits (18, 19 and 25), the length of the pipe is determined from a point where ozone is introduced to a point where the ozone injected water is introduced into the basin (8) based on the ozone-in-water mass transfer rate or utilization relationship.

The length of the conduit determined based on the ozone-in-water mass transfer rate is found to dissolve a substantial amount of ozone in the water whereby little or no ozone is gassed off to the atmosphere.

In a conventional cooling system, the amount of ozone injected is usually such that its concentration level in the water in the conduit (33) prior to reaching the basin (8) is generally within the range of about 1 to about 1.8 mg of ozone/liter of water, with its actual concentration level depending on water temperature and pressure and system economics (stated mg/liter level assumes zero ozone demand). Although a higher ozone concentration level is possible, it has been also found that the use of a lower ozone concentration level is effective for removing, among other things, scale deposits in water cooling systems. The ozone concentration level, of course, is dependent on various factors including the amount of the ozone injected through the injector (28).

Commonly, the ozone injected is generated from a conventional ozone generator (30), such as corona discharge unit. The amount of ozone provided to the injector (28) from the generator (30) via a conduit (29) may be controlled by valve (32). A Pressure indicator (36) may be provided, also, to monitor a pressure at which ozone is introduced into the injector (28). The ozone is made from various dried oxygen containing gases, including air and/or pure oxygen, which are supplied to the generator (30) through a conduit (31) at a controlled rate using valves (38 or 40). The dried oxygen containing gases may be purified using filtering means (42), such as small particulate filters, before they are used to generate ozone. The dried oxygen containing gases are known to be produced, among other things, by refrigeration, adsorption, silica gel and/or membrane treatments.

The following examples are presented for illustrative purposes and are not intended to be limiting.

EXAMPLE 1

The following tabulation is a comparison of a known commercially available cooling water ozonation system and the present invention as shown in FIG. 1. The known system includes two ozone generators, side stream pumping, injection tee, a mass transfer loop and basin distribution system.

|  | Known | Invention |
| --- | --- | --- |
| Recirculation flow rate (gpm) | 11000 | same |
| System volume (gpm) | 120000 | same |
| Tons of refrigeration | 4991 | same |
| Generator output (grams/hour) | 2540 | 233 |
| Side stream flow rate (gpm) | 1200 | 820 |
| Side stream dosage (mg/l) | 9.3 | 1.25 |
| Mass transfer pipe size (in) | 8 | 6 |
| Injection system | pipe tee | venturi |
| Side stream pressure (psig) | 18 | 20 |
| Injection means $\Delta$p (psi) | 1.0 | 60 |
| Side stream pipe length (ft) | 87 | 90 |
| Length required for dissolution of design generated ozone (ft) | 640 | 90 |

EXAMPLE 2

The following tabulation is a comparison of the cooling water ozonation system as shown in U.S. Pat. No. 4,171,786 and the present invention as shown in FIG. 1.

|  | U.S. Pat. No. 4171786 | Invention |
| --- | --- | --- |
| Recirculation flow rate (gpm) | 1700 | same |
| System volume (gpm) | 6000 | same |
| Tons of refrigeration | 600 | same |
| Generator size (grams/hour) | 90 | 28 |
| Side stream flow rate (gpm) | 38 | 65 |
| Side stream dosage (mg/l) | 10.4 | 1.66 |
| Mass transfer pipe length (ft) | — | 70 |
| Mass transfer pipe size (in) | — | 1.5 |
| Injection system | venturi | same |
| Side stream length where required dosage exceeds solubility (feet) | 20 | never |

As shown in the examples, the invention imparts various advantages in the area of the amount of the ozone dissolved and the amount of ozone used. In spite of injecting a lesser amount of ozone, a greater amount of ozone is dissolved. As can be seen, the amount of ozone used in the invention is less than about 30% of what is required in the known cooling systems. The use of this lesser amount, however, is effective because a higher percentage of the added ozone is dissolved in the aqueous solution. These results are due to (1) injecting ozone with at least one injection means operating with a high pressure drop, (2) increasing the velocity of a stream of aqueous solution after injecting ozone, and (3) allowing the ozone injected stream to travel or flow for a distance sufficient to dissolve at least about 70% of ozone in said stream. The sufficient distance is determined based on the ozone-in-water mass transfer rate and may be translated into a residence time for ozone in a stream which is subject to particular conditions.

Although the processes and apparatus of the present invention has been described in detail with reference to certain embodiments, those skilled in the art will recognize that there are other embodiments of the invention within the spirit and scope of the invention.

What is claimed is:

1. A process for dissolving ozone in aqueous solutions comprising:
   (a) injecting ozone through at least one ozone injection means operating with a pressure drop of at least about 35 psi into a stream of aqueous solution to form an ozone containing stream;
   (b) combining said ozone containing stream with a second aqueous solution to form a combined solution; and
   (c) increasing or regulating the velocity of the combined solution to at least about 7 feet per second.

2. A process according to claim 1, wherein said combined solution flows or travels for a distance sufficient to dissolve at least about 85% of said ozone in said combined solution prior to mixing said combined solution with an aqueous solution to be ozonated.

3. A process according to claim 2, wherein said distance is determined solely on an ozone-in-water mass transfer rate relationship which is defined by a formula:

$$\Delta C = (k)(T_v);$$

where
k is $0.02691$ (ID pipe)$^{0.68}$; $T_v$ is $$T_v \text{ is } \left[\frac{A \text{ pipe}}{GPM}\right] L; \text{ and}$$

L; and $\Delta C$ is (C sat. - C); and where C sat. is ozone solubility at saturation conditions; C is actual ozone solubility; ID pipe is an internal pipe diameter of pipeline; A pipe is an internal cross-sectional area of pipeline; GPM is an aqueous solution volumetric flow rate; and L is a pipeline length.

4. A process according to claim 3, wherein said combined solution flows in a conduit or pipe.

5. A process according to claim 4, wherein the combined solution is maintained at a velocity of about 9 to about 15 feet/second throughout the length of said pipe or conduit.

6. A process according to claim 1, wherein said ozone is injected through said injection means operating with a pressure drop of about 50 psi to about 60 psi.

7. A process according to claim 1, wherein said stream of aqueous solution is pressurized to at least about 35 psi above the pressure of said resulting ozone injected stream.

8. A process according to claim 2, wherein an ozone concentration level in said combined solution just before said mixing is about 1 to 1.8 mg. per liter of said solution.

9. A process according to claim 4, wherein said stream of aqueous solution or combined solution represents at least a portion of said aqueous solution to be ozonated.

10. A process according to claim 9, wherein an ozone concentration level in said combined solution is such that any localized ozone concentration, upon mixing said aqueous solution to be ozonated with said combined solution, is less than about 0.5 mg per liter of the resulting mixture.

11. A process according to claim 10, wherein said mixture is cooling water in a cooling tower basin.

12. A process according to claim 11, wherein at least a portion of said cooling water containing less than 0.5 mg ozone per liter of water is utilized in process heat exchange means before it is recycled back to said cooling tower basin.

13. A process according to claim 1, wherein said injection means is at least one venturi-type injector.

14. A process for dissolving ozone in aqueous solutions comprising:
   (a) injecting ozone through at least one injection means operating with a pressure drop of at least 35 psi into a stream of aqueous solution flowing in a conduit or pipe; and
   (b) allowing the resulting ozone injected stream to flow or travel at a velocity of at least 7 feet per second in said conduit or pipe, which is long enough to dissolve at least about 70% of said ozone, before using said ozone injected stream for its purpose.

15. A process according to claim 14, wherein the length of said pipe or conduit from a point at which said ozone is injected to a point just prior to using said ozone injected stream is determined solely on the ozone-in-water mass transfer rate relationship which is defined by a formula:

$$\Delta C = (k)(T_v);$$

where
k is $0.02691$ (ID pipe)$^{-0.68}$;
$T_v$ is $$T_v \text{ is } \left[\frac{A \text{ pipe}}{GPM}\right] L; \text{ and}$$

L; and $\Delta C$ is (C sat. - C); and where C sat. is ozone solubility at saturation conditions; C is actual ozone solubility; ID pipe is an internal pipe diameter of pipeline; A pipe is an internal cross-sectional area of pipeline; GPM is an aqueous solution volumetric flow rate; and L is a pipeline length.

16. A process according to claim 14, wherein the ozone injected stream is allowed to mix with an aqueous solution to be ozonated once at least about 70% of the ozone injected is dissolved.

17. An aqueous solution ozonation system comprising:
   (a) means for increasing the pressure of a stream of aqueous solution to at least about 35 psi higher than the pressure of ozone injected aqueous stream;
   (b) ozone injecting means for introducing ozone into the pressurized stream;
   (c) means for regulating or increasing the velocity of the ozone injected stream to at least about 7 feet per second;

(d) means for allowing the ozone injected stream to flow or travel for a distance sufficient to dissolve at least about 70% of the injected ozone; and
(e) means for mixing the resulting ozonated stream with an aqueous solution to be ozonated.

18. An aqueous solution ozonation system according to claim 17, wherein said means for increasing the pressure of a stream comprises at least one pump.

19. An aqueous solution ozonation system according to claim 18, wherein said ozone injection means comprises at least one venturi type ozone injector.

20. An aqueous solution ozonation system according claim 19, wherein said means for allowing the ozone injected stream to flow or travel for a distance sufficient to dissolve at least about 70% of the injected ozone comprises a pipe or conduit having a length that is sized or designed in accordance with the ozone-in-water mass transfer rate relationship as defined by a formula:

$$\Delta C = (k)(T_v);$$

where
k is $0.02691$ (ID pipe)$^{-0.68}$; $T_v$ is $$T_v \text{ is } \left[\frac{A \text{ pipe}}{GPM}\right] L; \text{ and}$$

L; and
$\Delta C$ is (C sat. - C); and where C sat. is ozone solubility at saturation conditions; C is actual ozone solubility; ID pipe is an internal pipe diameter of pipeline; A pipe is an internal cross-sectional area of pipeline; GPM is an aqueous solution volumetric flow rate; and L is a pipeline length.

21. An aqueous solution ozonations system according to claim 20, wherein said means for mixing comprises at least one perforated pipe in a shallow basin or at least one mixing eductor in a basin having a depth of at least about five feet.

* * * * *

UNITED STATES PATENT AND TRADEMARK OFFICE
CERTIFICATE OF CORRECTION

PATENT NO. : 5,186,841

DATED : February 16, 1993

INVENTOR(S) : Robert P. Schick

It is certified that error appears in the above-identified patent and that said Letters Patent is hereby corrected as shown below:

In claim 3, line 6, column 7, claim 15, line 10 column 8, and claim 20, line 9, column 9, please delete "Tv is" since "Tv is" is provided on the subsequent line.

In claim 3, line 8, column 7, claim 15, line 12 column 8, and claim 20, line 11, column 9, please delete "L; and" since "L; and" is also provided on the previous line as part of a formula.

Signed and Sealed this

Eighteenth Day of October, 1994

Attest:

BRUCE LEHMAN

*Attesting Officer*    *Commissioner of Patents and Trademarks*